United States Patent
Hale et al.

(10) Patent No.: US 6,603,901 B1
(45) Date of Patent: Aug. 5, 2003

(54) OPTICAL FIBER GRATINGS WITH INDEX MATCHED POLYMER COATING FOR CLADDING MODE SUPPRESSION

(75) Inventors: Arturo Hale, New York, NY (US); Thomas Andrew Strasser, Warren, NJ (US); Paul Stephen Westbrook, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/518,038

(22) Filed: Mar. 3, 2000

(51) Int. Cl.⁷ .................................................. G02B 6/34
(52) U.S. Cl. ........................ 385/37; 385/123; 385/128; 385/145
(58) Field of Search ............................ 385/31, 37, 123, 385/124, 125, 126, 127, 128, 145

(56) References Cited

U.S. PATENT DOCUMENTS

| | | | | |
|---|---|---|---|---|
| 4,597,987 A | * | 7/1986 | Hockemeyer et al. | 427/54.1 |
| 5,484,822 A | * | 1/1996 | Minns | 522/35 |
| 6,009,222 A | * | 12/1999 | Dong et al. | 385/127 |
| 6,240,224 B1 | * | 5/2001 | Reekie et al. | 385/37 |
| 6,351,588 B1 | * | 2/2002 | Bhatia et al. | 385/123 |

* cited by examiner

*Primary Examiner*—Brian Healy
*Assistant Examiner*—Sung Pak

(57) ABSTRACT

In accordance with the invention, an optical fiber Bragg grating comprises a length of gloss optical fiber having a core, a Bragg grating formed along the core, a glass cladding and a polymer coating on the cladding having an index of refraction matched to that the cladding. Such index matching can reduce the cladding mode loss by a factor of four over current levels. A preferred coating material comprises fluorinated urethane acrylate.

23 Claims, 2 Drawing Sheets

— STANDARD HIGH INDEX COATING
--- NEAR INDEX MATCHED COATING
⋯ NO COATING

OPTICAL FIBER GRATINGS WITH INDEX MATCHED POLYMER COATING FOR CLADDING MODE SUPPRESSION

FIELD OF THE INVENTION

This invention relates to optical fiber Bragg gratings and, in particular, to a fiber Bragg grating provided with an index-matched polymer coating to reduce short wavelength cladding mode loss.

BACKGROUND OF THE INVENTION

Optical fiber Bragg gratings are critical wavelength filtering components in WDM communication systems. In these applications, the grating is typically used as a reflective filter. Incident light within the stopband of the grating is strongly reflected whereas light outside the stopband is transmitted. An ideal Bragg grating would possess a rectangular amplitude filter function; the reflection would be unity within the stopband and reflection and loss would be negligible outside the stopband.

In practice, an important limitation on a realistic optical fiber Bragg grating is cladding mode loss on the short wavelength side of the main reflection band. This short wavelength cladding mode loss is caused by coherent coupling from the grating into backward propagating cladding modes. The cladding mode loss is seen in the transmission spectrum as sharp resonances, approximately periodically spaced, on the short wavelength side of the Bragg resonance. The magnitude of the loss scales approximately with the square of the strength of the grating, and the loss is dramatically exacerbated when many gratings are cascaded. It thus imposes strict limitations on the design of optical networks that use gratings.

Several approaches have been proposed for reducing Bragg grating coupling into claddings. A first approach uses a depressed cladding design. See L. Dong et al. "Optical Fibers with Depressed Claddings for Suppression of Coupling into Cladding Modes in Fiber Bragg Gratings," *IEEE Photonic Technology Letters*, Vol. 9, page 64–66 (1997). A conventional fiber core is surrounded by a down-doped region, typically using boron to achieve the down doping. The depressed cladding region suppresses the overlap of lower order cladding modes with the core. The transverse oscillations are stretched in the depressed cladding region, since the traverse resonance condition is associated with the optical path length (distance times refractive index). This approach has been demonstrated with moderate success. But it is limited by the amount that the index can be reduced in the depressed cladding region.

A second approach is to increase the offset of the cladding mode loss from the Bragg resonance. This is achieved by increasing the core refractive index such that the effective core mode index is substantially above that of the lowest order cladding mode. In practice, this means that the core mode has an effective index substantially above the refractive index of silica, since the lowest order cladding mode has an effective index very close to the refractive index of silica. As a result the cladding mode resonances are offset from the Bragg resonance. Various groups have demonstrated this effect, where typically a fiber with $\Delta \sim 2\%$, and a core diameter of d~2 µm, is used, resulting in an offset of ~8 nm. Although the principle has been demonstrated, the usable bandwidth is still limited by the onset of cladding mode loss. In addition there is a significant splice loss penalty incurred due to mode mismatch between the grating fiber and the transmission fiber.

The cladding mode loss can also be reduced by incorporating photosensitive material into the cladding of the fiber. (See, e.g., E. Delevaque et al. "Optical Fiber Design for Strong Gratings Photoimprinting with Radiation Mode Suppression," *OFC '95*, PD5, USA, 1995 and K. Oh et al., "Suppression of Cladding Mode Coupling in Bragg Grating Using $GeO_2$—$B_2O_3$ doped Photosensitive Cladding Optical Fiber", *Electronic Letters*, Vol. 35, page 423–424 (1999)). In this case, after UV exposure the grating region extends into the cladding region. The reduction in the cladding mode loss follows from the orthogonality condition. Hence if the core and the cladding have the same UV sensitivity, there is no blaze and the exposure through the fiber is uniform. Thus the grating will give negligible coupling to the cladding modes. A disadvantage of this scheme is a net reduction in the grating strength due to absorption in the photosensitive cladding region. There is also an increased coupling to asymmetric modes because of the increased asymmetry in the region where these modes have a large mode field strength.

Cladding mode loss is also reduced by the polymer coating conventionally applied around the cladding for environmental protection. The standard polymer coatings are lossy and have a refractive index greater than that of silica. (Typically $n_{polymer}=1.51$; $n_{silica}=1.45$). In this case, the cladding modes extend into the polymer where they are absorbed, and thus coherent feedback into the fiber is reduced. The reduced cladding mode loss is acceptable for many applications but can still limit the number of devices that can be cascaded.

Accordingly, there is a need for an improved fiber design which can effectively eliminate cladding mode loss in fiber Bragg gratings.

SUMMARY OF THE INVENTION

In accordance with the invention, an optical fiber Bragg grating comprises a length of glass optical fiber having a core, a Bragg grating formed along the core, a glass cladding and a polymer coating on the cladding having an index of refraction matched to that of the cladding. Such index matching can reduce the cladding mode loss by a factor of four over current levels. A preferred polymer coating material comprises fluorinated urethane acrylate.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graphs, are not to scale.

DETAILED DESCRIPTION

Figure 1:
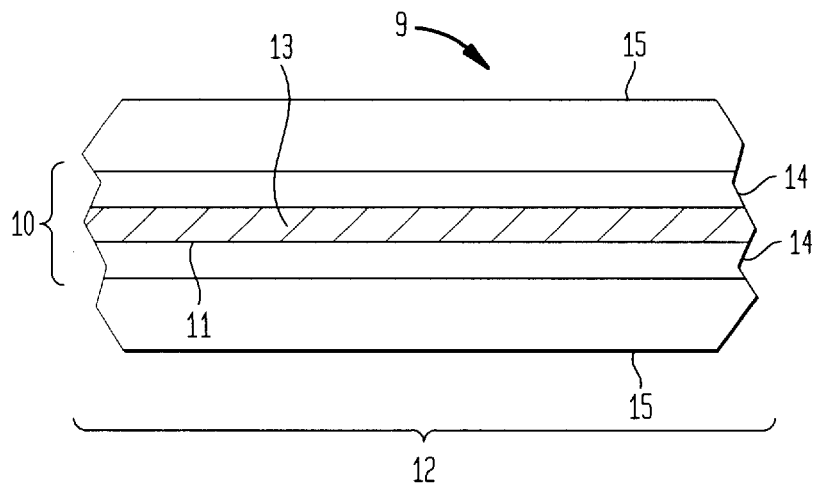
FIG. 1 is a schematic longitudinal cross section of an optical fiber grating in accordance with the invention.

Referring to the drawings, FIG. 1 is a schematic longitudinal cross section of an optical fiber grating device 9 in accordance with the invention. The device 9 comprises a length of fiber 10 having a core 11, including a grating region 12. The region 12 is composed of a plurality of index peturbations 13 periodically spaced along its length. The core 11 is surrounded by a glass cladding 14, and the cladding is coated with a cured polymer coating 15 index-matched to the cladding.

The core 11 typically comprises silica doped with Germania and has an index of refraction greater than that of the cladding. The difference, Δn, is typically about 0.01.

The cladding 14 is typically high purity silica glass. Typical cladding glass refractive indices are in the range of about 1.44–1.45 measured at λ=1550 nm. Typical cladding diameter is about 125 micrometers.

The polymer coating 15 in accordance with the invention is index-matched with the cladding glass at the wavelength and temperatures of use. Index matching for these purposes typically means that the polymer coating refractive index is above the cladding glass refractive index for at least part of the operating temperature range (−40° C. to 100° C.) and below that of the cladding glass for at least part of the operating temperature range. This matching reduces coupling of the cladding modes with the core mode, thereby reducing cladding mode loss. The polymer can be substantially lossless at the operating wavelength or can have loss at the operating wavelength in order to further reduce core cladding coupling. Advantageous index matching can typically be specified by the condition ($-0.01 < n_{polymer} - n_{cladding} < 0.02$) where $n_{polymer}$ is the refractive index of the polymer and $n_{cladding}$ is the index of the cladding glass. Preferably $-0.006 < n_{polymer} - n_{cladding} < 0.016$. The polymer advantageously has a liquid prepolymer form with a relatively high viscosity (500–100,000 centipoise) so that it can be easily coated. It also is preferably photocurable by ultraviolet light. In order to adequately protect the integrity of the coated fiber, the elastic modulus of the cured coating should be greater than 10 MPa, and preferably greater than 30 MPa. The cured polymer can have a thickness in excess of about five micrometers and typically is about 60 micrometers.

Silicone polymers (polysiloxanes) can be used as index-matched coatings, although they may require additional buffering because they may be too soft to provide adequate mechanical protection. Suitable silicones polymers comprise repeat units chosen from a) di-alkyl siloxane (e.g., dimethyl siloxane), b) di-aryl siloxane (e.g., diphenyl siloxane), and c) alkyl aryl siloxane (e.g., methyl phenyl siloxane), as well as blends and copolymers thereof. Polymers with polysilsesquioxane backbones can also be formulated to match the index of silica.

Preferred polymers comprise halogenated moieties and hydrocarbon moieties in such proportions as to yield the desired refractive index. The different proportions can be achieved by blending, copolymerization, or both. For example, when fluorinated and aliphatic hydrocarbon moieties are combined to obtain the proper refractive index, it is desirable to have a formulation containing between 5 and 40% by weight fluorine, and preferably between 10 and 35%. As a further illustration, the polymer coating may comprise the polymerization product of (a) 5 to 100% by weight of a fluorine-containing urethane(meth)acrylate: (b) 0 to 95% by weight of a mono-functional or di-functional (meth)acrylate monomer; and (c) 0 to 95% by weight of an aliphatic or aromatic urethane acrylate oligomer.

The coating formulation advantageously contains photo-curable units, although thermo-curable units can also be employed. Hard coatings can be produced by using di- or multi-functional components that provide high cross-link density. In the case of photocurable formulations, a small amount of photoinitiator is usually needed (between 0.01% and 10% by weight). The photocurable units are well known in the art. There are units that are photocurable by free radical mechanisms, and units that are curable by cationic mechanisms. Examples of free-radical photocurable units include acrylates, methacrylates, acrylamides, olefin-thiol systems, styrene and its derivatives. Examples of free radical photoinitiators include benzophenone and its derivatives, acetophenone and its derivatives, benzoin derivatives, benzil ketals, alkylphenones, alpha-aminoalkyl phenones, acylphosphine oxides, and thioxanthone/amines. Examples of units photocurable by cationic mechanisms include epoxies and vinyl ethers. Examples of cationic photoinitators include onium salts such as triaryl sulfonium and diaryl iodonium salts, and irone arene complexes.

It has been found that the introduction of urethane groups is a convenient way to obtain the proper viscosity for coating the fiber device and to provide good mechanical strength and toughness. We define as tough a polymer whose elongation at break is greater than 10%.

A convenient way to synthesize coatings for this invention consists of reacting the hydroxyl functionality of a fluorinated alcohol with one mole of a diisocyanate, and then reacting the product with a hydroxy-containing photocurable moeity, such as a hydroxy-alkyl acrylate or a hydroxy-alkyl methacrylate. Alternatively, the hydroxy-alkyl(meth) acrylate can be reacted first with the diisocyanate, and the product reacted with the fluorinated alcohol. The product of these reactions is a fluorinated urethane (mmeth)acrylate. It may then be blended with other photocurable monomers and oligomers to obtain the proper viscosity, refractive index, and mechanical properties of the cured product. Difunctional monomers such as hexane diol diacrylate will lower the viscosity and provide hardness; urethane acrylate oligomers can also be blended in to provide flexibility, lower cure shrinkage, higher viscosity, and higher toughness.

An exemplary polymer for index matching with silica cladding was made by reacting tridecafluorooctanol with isophorone diisocyanate and then reacting the product with hydroxyethyl acrylate. The end product ("OIA") is a linear urethane acrylate with a perfluorinated tail. OIA is highly viscous and is miscible with hydrocarbon-based acrylates such as hexanediol diacrylate and with commercial urethane acrylate oligomers such as Sartomer CN 983 and CN 963.

The following procedure produces OIA. 116.3 ml of isophorone diisocyanate (IPDI) was charged into a glass reactor equipped with stirring and dry purge. 0.42 g BHT (2,6-di-tert-butyl phenol) was added and dissolved in the IPDI. 0.2 ml dibutyltin dilaurate was added to the solution, keeping it under a dry air purge. 121.1 ml tridecafluorooctanol was added dropwise over a period of 1 hour, keeping the reaction temperature at 50° C. The temperature was then raised to 70° C. and the reaction was allowed to proceed for 3 hours. 63 ml of 2-hydroxyethyl acrylate was then added dropwise over a period of 30 minutes. The reaction was allowed to proceed for 15 hours at 70° C. The end of the reaction was confirmed by the disappearance of the NCO infrared peak at 2270 cm$^{-1}$. The product is a viscous liquid at 70° C., but it turns into a semisolid transparent wax at room temperature.

The OIA prepared as above thus comprises the reaction product of a fluorinated alcohol, a diisocyanate, and a hydroxy-containing photocurable hydrocarbon. Other combinations of fluorinated moieties including fluorinated alcohols and hydrocarbon moieties are also contemplated for preparing the formulation to produce the polymer coating of this invention. A formulation comprising OIA or other fluorine-containing urethane acrylate may be combined (e.g., by blending or polymerization) with other monomers or oligomers to produce the desired coating having proper viscosity, refractive index, elastic modulus, and other mechanical properties. Suitable percentages for the formulation include use of (a) 40 to 85% by weight of the reaction product of a fluorinated alcohol, a diisocyanate, and a hydroxy-containing photocurable hydrocarbon; (b) 0 to 60% by weight of a urethane acrylate oligomer; (c) 0 to 60% by weight hexanediol diacrylate (e.g., 1,6-hexanediol di acrylate); and (d) about 0.01 to 10% of a photoinitiator.

Examples of suitable blends for the polymer coating are given below:

EXAMPLE 1

As a first specific example, a blend of 73.51 wt. % OIA, 11.84% Sartomer CN 963B80 urethane acrylate oligomer, 12.63% hexane diol diacrylate, and 2.02% Darocur 1173 (photoinitiator) yields a photocurable high viscosity prepolymer that can be easily coated on fibers using commercial recoaters. This formulation contains 25.9% wt. fluorine. After UV curing, this product turns into a hard, tough protective polymer with a refractive index of 1.444 at 1550 nm.

EXAMPLE 2

As a second example, a blend consisting of 53.4 parts of OIA (by weight), 35 parts of Sartomer CN 963B80, 11.6 parts hexanediol diacrylate, and 2 parts Darocur 1173 yielded a coating with a refractive index of 1.4604 at 1550 nm after UV cure. This formulation contains 18.4% wt. Fluorine. An advantage of this second formulation is that the higher index ensures the polymer coating index is higher than that of silica cladding even at high temperatures up to about 80° C.

EXAMPLE 3

75 parts by weight of OIA was blended with 25 parts of 1,6-hexanediol diacrylate and 1.4 parts of Darocur 1173 photoinitiator (Ciba Specialty Chemicals). The components were miscible. This formulation contains 26% wt. fluorine. The blend was cured under UV light into a hard film. Its refractive index at 1550 nm was measured using a prism coupler, obtaining a value of 1.445.

EXAMPLE 4

74.4 parts by weight of OIA was blended with 16 parts by weight of hexanediol diacrylate, 9.51 part of Sartomer CN983 B88 urethane acrylate oligomer, and 3.4 parts Darocur 1173. The components were miscible. This formulation contains 25.3% wt. fluorine. The blend was cured under UV light into a hard, tough film. Its refractive index at 1550 nm was measured using a prism coupler, obtaining a value of 1.4495.

In order to demonstrate the advantage of the FIG. 1 grating device over conventional gratings, applicants conducted the following experiment.

EXPERIMENT

Figure 2:
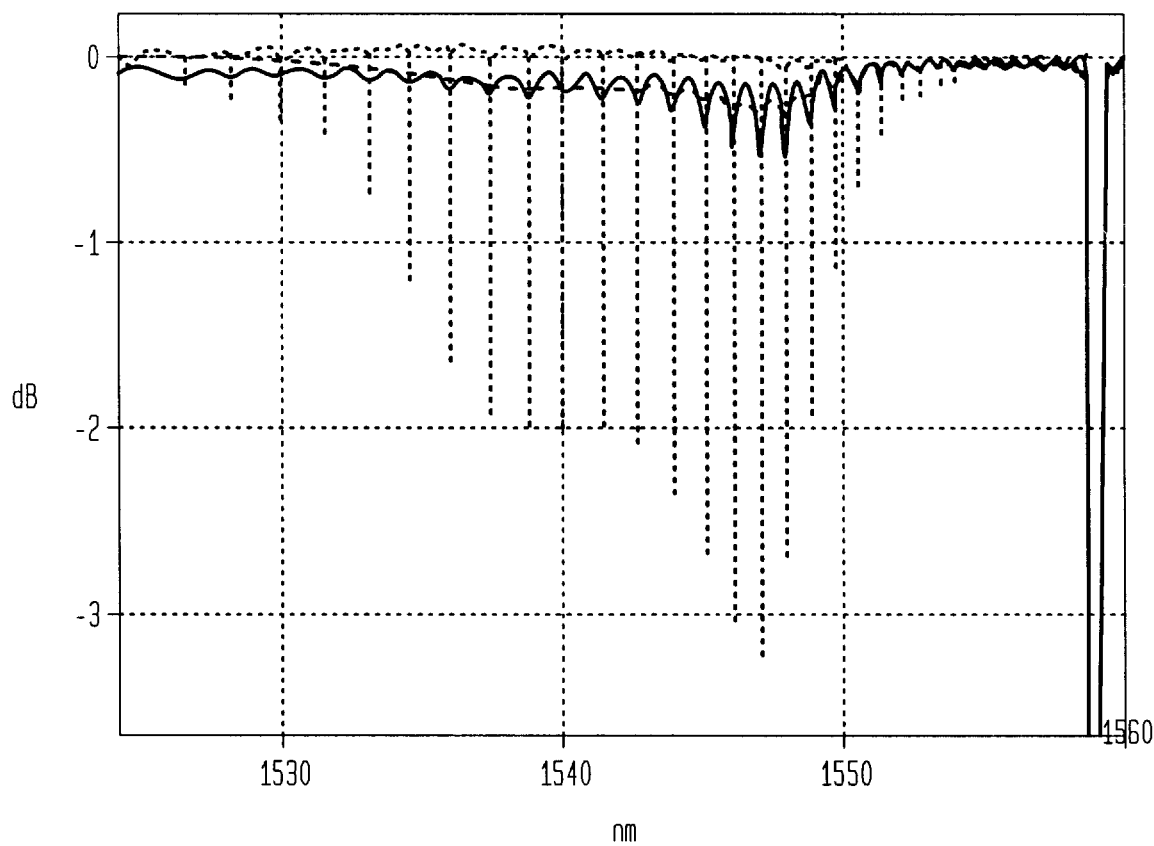
FIG. 2 is a graphical illustration comparing the transmission characteristic of the grating of FIG. 1 with those of a conventional polymer coated optical fiber grating.

Standard add/drop gratings were fabricated in depressed clad fiber with reduced cladding mode coupling at 242 nm using an excimer pumped dye laser and doubling crystal via exposure through a phase mask. The spectrum of the grating was then recorded in three different configurations: uncoated, coated with a standard polymer coating whose index is larger than silica (n=1.51), and the index matched coating of the first example. The resulting cladding spectra, all taken at room temperature are shown in FIG. 2. The near index matched polymer provides a factor of two greater smoothing (as measured by the peak-to-peak loss ripple).

The polymer index varies strongly with temperature (dn/dT~10 times silica), and therefore it was necessary to examine the variation of the cladding spectrum with temperature. The grating was placed in a tube furnace and its cladding spectrum was measured for several temperatures. The grating was held straight during the temperature measurements.

Figure 3:
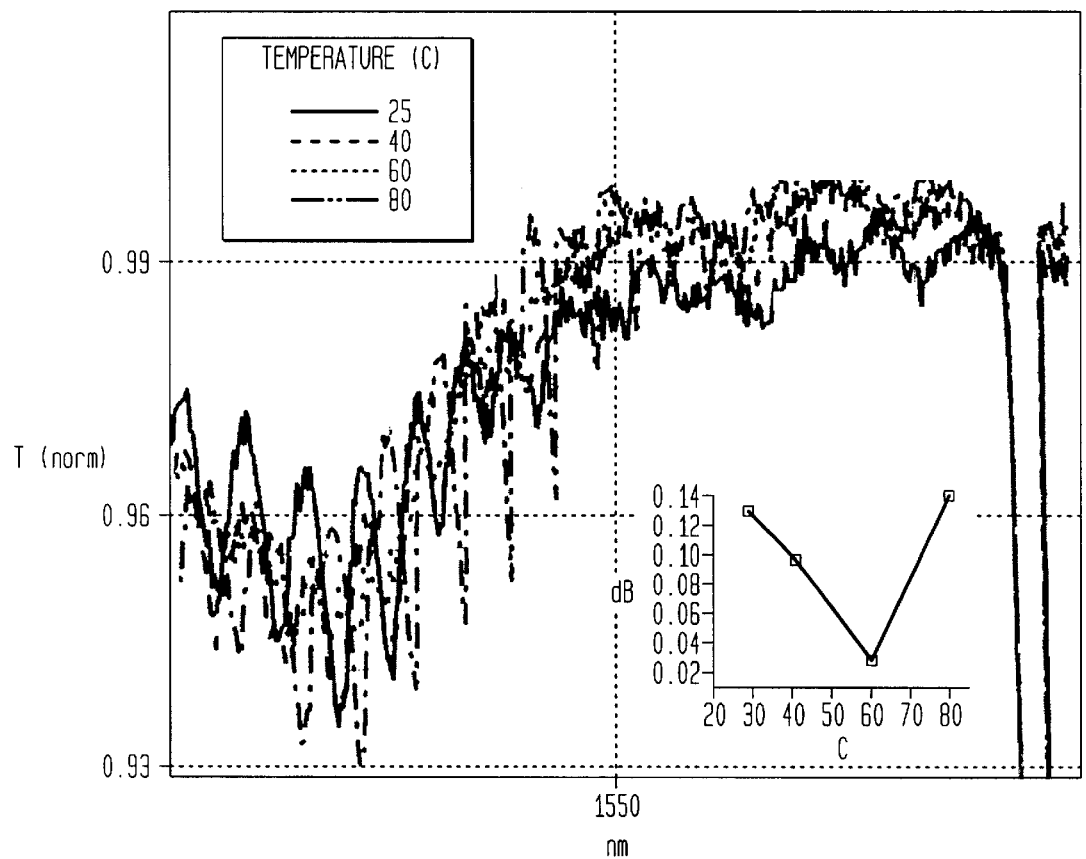
FIG. 3 illustrates cladding loss ripple as a function of temperature.

FIG. 3 shows the spectra as a function of temperature with an inset that gives the peak-to-peak cladding loss ripple as a function of temperature. (The low level of absolute loss was difficult to measure because of variation in normalization over 30 nm). As can be seen, the ripple decreases as a function of temperature and is zero close to 60° C. At 80° C. two features are apparent in the spectrum. The cladding resonances have already become quite large, and they have shifted over by approximately half the spacing of the cladding spectrum. Both of these observations are consistent with the assumption that the index of the polymer has gone below that of silica. A low index polymer coating ($n_{polymer} < n_{silica}$) will tend to confine the cladding modes due to total internal reflection, and therefore increase the core-cladding overlap. Moreover the phase shift of light reflecting from the boundary changes sign since the reflected E-field depends on the difference of the two indices across the interface, thus causing each cladding resonance condition to shift by a half wavelength.

The smoothing of the cladding mode loss may be understood by considering the coupling between the core mode and cladding modes. The effect of the index matched polymer is to spread the cladding modes over a larger area, thus making the cladding mode E-field smaller in the core region. An important additional effect is due to the optical loss in the polymer. As the polymer loss, due to both absorption and scattering is increased, the individual resonances become less well defined. In the limit in which the polymer loss is sufficiently large that light entering the polymer does not return to the core region in a coherent manner (as it would be reflecting off of a well defined cylindrical air-silica interface), the cladding mode resonances are completely smoothed out. This regime corresponds to the radiation mode limit of cladding mode loss, which is achieved when the cladding is infinite in extent. The lossy index matched polymer thus acts to approximate the radiation mode limit of the cladding mode loss, providing the lowest, and most uniform spectrum possible for a given grating induced cladding mode loss.

These measurements show that it is preferable to maintain a polymer index that is above that of silica for the entire temperature range of interest. We have fabricated such a polymer (Example 2) and have verified that the index remains above that of silica for T<80° C. The peak-to-peak index variations for this grating were below 0.15 dB for the entire range T=27–80° C. This represents a ~2 fold increase over present gratings. Moreover, because cladding resonances are smoothed, this will enable further fiber designs that reduce the loss even more. We note that this smoothing of the cladding loss will enable fiber designs in which the cladding loss may be very low but in which the onset of the loss is relatively close to the core. Depressed clad fibers are an example of such a fiber design.

Figure 4:
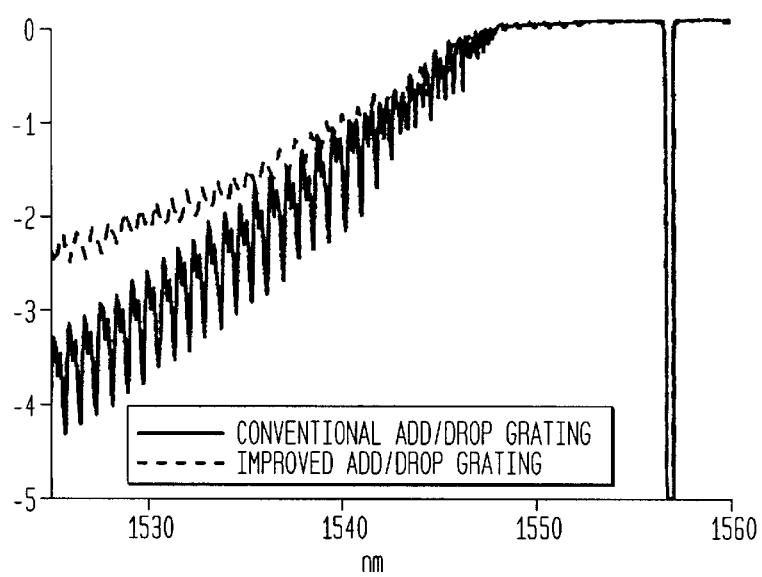
FIG. 4 compares the spectrum of a concatenation of the improved gratings with a concatenation of conventional gratings.

FIG. 4 shows the concentrated loss spectrum for 40 of the improved grating spectra spaced by 100 GHz as well as the concatenated loss for a conventional grating. Both the overall loss (~2.5 dB) as well as ripple (<0.5 dB) have been reduced.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. An improved optical fiber Bragg grating device for operating over a temperature range comprising a length of glass optical fiber having a core, a Bragg grating formed along the core, and a glass cladding around the core, the improvement comprising:
    a polymer coating around the glass cladding for reducing cladding mode loss, the polymer having an index of refraction above that of the cladding for at least part of the temperature range and below that of the cladding for at least part of the temperature range.

2. The improved grating device of claim 1 wherein the glass cladding has an index of refraction $n_{cladding}$, the polymer coating has an index of refraction $n_{polymer}$, and $-0.01 < n_{polymer} - n_{cladding} < 0.02$.

3. The improved grating device of claim 1 wherein the glass cladding has an index of refraction $n_{cladding}$, the polymer coating has an index of refraction $n_{polymer}$, and $-0.006 < n_{polymer} < n_{cladding} - 0.016$.

4. The improved grating device of claim 1 in which the polymer coating has an elastic modulus of greater than 10 MPa.

5. The improved grating device of claim 1 in which the polymer coating comprises a polysiloxane or polysilsesquioxane and is optionally buffered for mechanical hardness.

6. The improved grating device of claim 1 wherein the polymer coating is prepared with a formulation comprising at least one halogenated moeity and at least one aliphatic or aromatic hydrocarbon moeity combined by at least one of blending or copolymerization.

7. An improved optical fiber Bragg grating device for operating over a temperature range comprising a length of glass optical fiber having a core, a Bragg grating formed along the core, and a glass cladding around the core, the improvement comprising:
    a polymer coating around the glass cladding for reducing cladding mode loss,
    wherein the polymer coating comprises the polymerization product of (a) 5 to 100% by weight of a fluorine-containing urethane (mmeth)acrylate; (b) up to about 95% by weight of a mono-functional or di-functional (meth)acrylate monomer; and (c) up to about 95% by weight of an aliphatic or aromatic urethane acrylate oligomer.

8. The improved grating device of claim 6, wherein the halogenated and hydrocarbon moeities are added to the formulation at percentages selected for producing the polymer coating index-matched to the glass cladding.

9. The improved grating device of claim 6 in which the formulation comprises about 5 to 40% by weight fluorine.

10. The improved grating device of claim 6 in which the at least one hydrocarbon moeity is a photocurable unit.

11. The improved grating device of claim 10 in which the at least one photocurable unit is selected from acrylates, methacrylates, acrylamides, olefin-thiols, styrene, epoxies, and vinyl esters.

12. The improved grating device of claim 10 in which the formulation further comprises a photoinitiator.

13. The improved grating device of claim 12 in which the photoinitiator is added to the formulation at about 0.01 to 10% parts by weight.

14. The improved grating device of claim 1 in which the polymer coating has a elongation at break of greater than 10%.

15. An improved optical fiber Bragg grating device for operating over a temperature range comprising a length of glass optical fiber having a core, a Bragg grating formed along the core, and a glass cladding around the core, the improvement comprising:
    a polymer coating around the glass cladding for reducing cladding mode loss, wherein the polymer coating comprises a urethane acrylate or (meth)acrylate prepared by reacting a fluorinated alcohol, a diisocyanate, and a hydroxy-containing photocurable hydrocarbon.

16. The improved grating device of claim 15, in which the fluorinated alcohol comprises tridecafluoroctanol, the diisocyanate comprises isophorone diisocyanate, and the hydroxy-containing hydrocarbon comprises hydroxyethyl acrylate.

17. The improved grating device of claim 1 wherein the polymer coating comprises a urethane acrylate with a per-fluorinated tail.

18. An improved optical fiber Bragg grating device comprising a length of glass optical fiber having a core, a Bragg grating formed along the core, and a glass cladding around the core, the improvement comprising:
    a polymer coating around the glass cladding, the polymer coating being prepared with a formulation comprising a blending and/or polymerization product of (a) 40 to 85% by weight of the reaction product of a fluorinated alcohol, a diisocyanate, and a hydroxy-containing photocurable hydrocarbon; (b) up to 60% by weight of a urethane acrylate oligomer; (c) up to 60% by weight hexanediol diacrylate; and (d) about 0.01 to 10% of a photoinitiator,
    wherein the glass cladding has an index of refraction $n_{cladding}$, the polymer coating has an index of refraction $n_{polymer}$, and $-0.01 < n_{polymer-ncladding} < 0.02$, such that the polymer coating reduces cladding mode loss.

19. The improved grating device of claim 18 in which the formulation comprises (a) 50 to 75% by weight of the reaction product of tridecafluoroctanol, isophorone diisocyanate, and hydroxyethyl acrylate; (b) 9 to 35% urethane acrylate oligomer; (c) 10 to 20% hexanediol diacrylate; and (d) 1 to 3% photoinitiator.

20. The improved grating device of claim 18 in which the formulation comprises about (a) 75% by weight of the reaction product of tridecafluoroctanol, isophorone diisocyanate, and hydroxyethyl acrylate; (b) 0% urethane acrylate oligomer; (c) 25% by weight hexanediol diacrylate; and (d) about 1% of a photoinitiator.

21. In an optical fiber Bragg grating device according to claim 1 comprising a length of silica optical fiber having a core, a Bragg grating formed along the core, and a silica cladding around the core.

22. Article as in claim 1 wherein the polymer is substantially lossless at the operating wavelength.

23. Article as in claim 1 wherein the polymer has loss at the operating wavelength in order to further reduce core cladding coupling.

* * * * *